Nov. 11, 1958

H. MEIJER 2,859,520

APPARATUS FOR MAPPING BY MEANS OF
OVERLAPPING AERIAL PHOTOGRAPHS

Filed March 8, 1957

HENDRIK MEIJER

*INVENTOR.*

INVENTOR
HENDRIK MEIJER
BY
ATTORNEY

HENDRIK MEIJER
INVENTOR.

Nov. 11, 1958   H. MEIJER   2,859,520
APPARATUS FOR MAPPING BY MEANS OF
OVERLAPPING AERIAL PHOTOGRAPHS
Filed March 8, 1957   9 Sheets-Sheet 8

HENDRIK MEIJER

*INVENTOR.*

BY

Nov. 11, 1958

H. MEIJER 2,859,520

APPARATUS FOR MAPPING BY MEANS OF
OVERLAPPING AERIAL PHOTOGRAPHS

Filed March 8, 1957

HENDRIK MEIJER

*INVENTOR.*

BY

2,859,520

APPARATUS FOR MAPPING BY MEANS OF OVERLAPPING AERIAL PHOTOGRAPHS

Hendrik Meijer, Delft, Netherlands, assignor to De Staat der Nederlanden, te dezen Vertegenwoordigd door de Hoofdingenieur-Directeur van de Rijkswaterstaat in de Directie Algemene Dienst en Waterhuishouding, The Hague, Netherlands Application March 8, 1957, Serial No. 644,900

Claims priority, application Netherlands March 8, 1956

10 Claims. (Cl. 33—1)

The invention relates to an apparatus for mapping by means of overlapping aerial photographs. It belongs to the group of photogrammetrical instruments in which no use is made of projectors but in which for the reconstruction of a terrainpoint there is only made use of the geometrical properties of the projecting rays belonging to this point.

Some instruments of this group are provided with means for eliminating mapping errors, resulting from the influence of the central projection, of the inclinations of the camera, of the differences in height of the points of the terrain. However, not one of known instruments from this group gives a geometrically exact solution of the reconstruction problem as a whole.

The apparatus according to the invention is founded upon a new view, i. e. that the place of a point on the photograph can be regarded as being the point of intersection of two lines, representing the intersecting of the plane of the photograph with two projecting planes through the corresponding point of the terrain and the optical center of the camera-objective, also defined as the projection centre, which are parallel with two assumed fixed co-ordinate axes. For different points of the terrain present on one single photograph these planes will form two bundles, the common intersections being the straight lines passing through the projection centre and being parallel to the co-ordinate axis belonging thereto. The intersections of the projecting planes with the plane of the photograph will thus form two bundles of lines, the respective centres being the points of intersection of the plane of the photograph with the lines mentioned, passing through the projection centre.

The object of the invention offers the possibility of providing an exact solution of the reconstruction problem as a whole, or, depending on the choice and/or the number of means to be left out, of approaching the solution of the problem more closely than is the case with the known types of instruments belonging to the group. Besides the apparatus of the invention continues to have the advantage which is characteristic of this group of instruments i. e. the very simple construction of the observation optics.

In general the apparatus will be constructed in such a way that the reconstruction of points of the terrain takes place, as is usual, with respect to a rectangular co-ordinate system X, Y, Z, the X-axis of which is substantially parallel with the direction of flight. As a result of the choice of such a co-ordinate system the above-mentioned projecting planes are parallel with the X-axis and the Y-axis respectively. The apparatus of the invention, based upon the principle as explained above, in which, for the determination of the position of points of a terrain, starting from a pair of aerial photographs, use is made of a stereoscopic observation system with two measuring marks and of a mechanism consisting of two coupled similar parts, each part of the mechanism being coupled to one of the measuring marks. At each image of a point of a terrain indicated by a measuring mark two bars with which each part of the mechanism is provided cross, which crossing is seen as an intersection point in its perpendicular projection on the plane of the photograph and hereinafter is indicated as "crossing point." These bars are thus coupled mutually and to the mechanism shifting the measuring mark and the bars correspond with the intersections of the plane of the photograph and the projection planes passing through the point of the terrain and the optical centre point of the photo objective, which projection planes are parallel or substantially parallel with the direction of flight and with a horizontal straight line perpendicular thereto.

Dependent on the application it is possible to have different embodiments of the general design of the apparatus of the invention. In each half of the mechanism the two bars will preferably be shifted by means of two pairs of arms which can rotate around a common axis, each pair of arms bearing a bar and the arms of each pair being coupled with each other in such a way that if one arm moves over a certain angle the other will move over the same angle in opposite direction, there being furthermore straight-lines conducting means in order to guarantee that the crossing points of the arms with the bars are shifted over special straight lines.

Should the apparatus of the invention be more particularly suitable for working out aerial photographs taken with a vertical or substantially vertical camera-axis, then the conducting means in each half of the mechanism are constructed as two pairs of mutually parallel horizontal conducting rails, lying on both sides of the axis at an adjustable distance. A coupling means, connecting an arm with a bar, slides over each of the rails, so that the crossing point between the arm and the bar always follows a straight course indicated by the rail. Furthermore, each of the parts of the mechanism is provided with two horizontal co-ordinate rails which are perpendicular to each other and which are situated at an adjustable distance from the axis, corresponding with the vertical distance between the photo objective and the point of terrain observed. One of each of the pairs of arms is constructed in such a way that it crosses a co-ordinate rail belonging thereto. From the positions of the two respective crossing points the $x$-co-ordinate and the $y$-co-ordinate respectively of the point of the terrain corresponding with the crossing point of the two bars can be determined by linear transformation.

According to the invention this apparatus can be adapted for photographs with an inclined camera-axis by replacing, dependent on the direction of the inclination, one or both of the arms, crossing a co-ordinate rail and bearing a bar, by two arms, rotating around the axis and enclosing an adjustable, fixed angle, one of the arms crossing the co-ordinate rail and the other bearing the bear.

It is also possible to provide the apparatus of the invention with means for giving the angle enclosed between the pair of arms bearing a bar, an adjustable, fixed correction. At the same time one of the pairs of conducting rails ought to be made adjustable with respect to the other pair lying in the horizontal plane, an angle being formed.

If the apparatus of the invention is provided with means mentioned in the last two paragraphs a plotting instrument is obtained which gives an exact solution for the reconstruction problem as a whole and which is thus suitable for accurately working out aerial photographs, independent of the fact whether these photographs are taken with a vertical or with a considerably inclined camera-axis.

Some embodiments of the invention will now be described with reference to the accompanying drawings and geometrical constructions, in which:

Fig. 7 is a top view of an axis, the arms of an embodiment according to Fig. 4 being hingedly connected thereto, while

In order clearly to show the connection between the various elements of the apparatus according to the invention on the one hand and the lines or points of the geometrical constructions in the plane of the photograph representing them on the other hand, the same letters for the same elements are used in the figures and the specification, the reference letters in the geometrical constructions being underlined for the sake of clarity.

Figure 1:
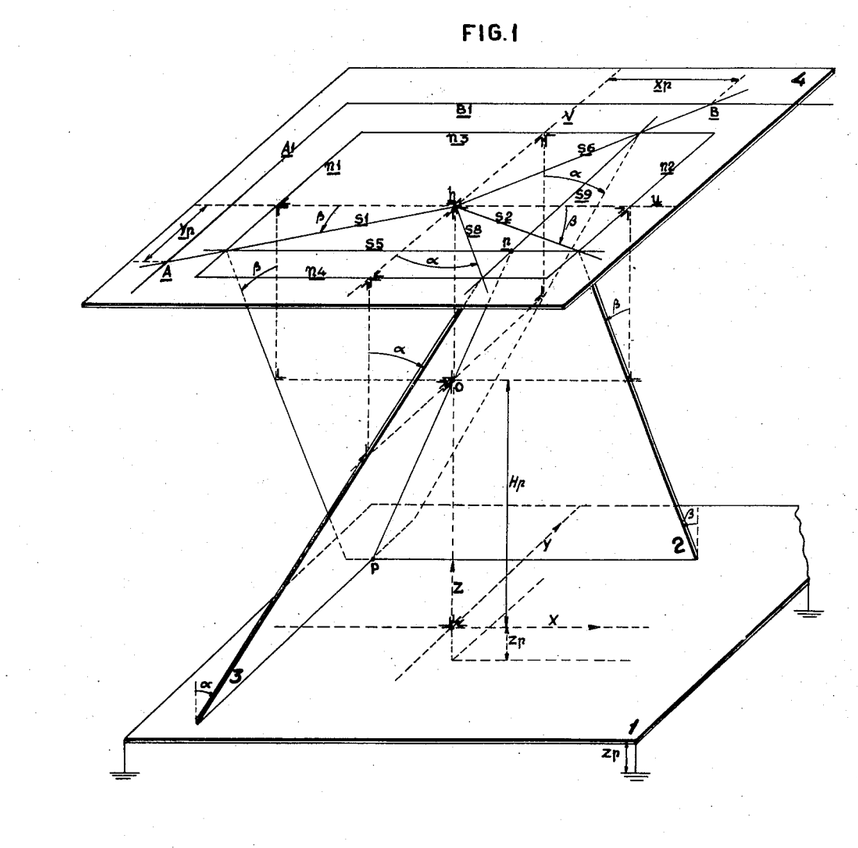
Fig. 1 gives perspectively the geometrical relation between a point of a terrain and its representation on the photograph taken with a vertical camera-axis.

In Fig. 1 reference numeral 1 represents a horizontal plane through a point of the terrain P with the co-ordinates $X_p$, $Y_p$ and $H_p$ with respect to the projection centre O (optical centre of the photo objective), X the co-ordinate axis parallel or substantially parallel with the direction of flight, Y the horizontal co-ordinate axis perpendicular to the X axis and Z the vertical co-ordinate axis. The co-ordinate axes X and Y lie in a plane from which the heights of the points to be mapped are measured. If the point P has a height co-ordinate $Z_p$ and if the height of the objective centre is $Z_0$, it stands to reason that $H_p = Z_0 - Z_p$.

The plane 4 is the photo plane which is supposed to be horizontal. $p$ is the point on the photograph corresponding with the point of the terrain P, the distance $Oh$ corresponding with the focal distance $f$ of the camera (not indicated in the drawing).

As mentioned before, the invention is based upon the view that the place of $p$ on the photograph can be considered to be the point of intersection of the two lines S9 and S5 representing the lines of intersection of the plane 4 of the photograph and the two planes 3 and 2 through OP, parallel to the Y axis and the X axis respectively. The place of P is also defined by the angles $\alpha$ and $\beta$. The position of the lines S9 and S5 in the plane of the photograph is thus dependent on the angles $\alpha$ and $\beta$ and on the angles $\varphi$ and $\omega$ (or $\varphi'$ and $\omega'$), Fig. 3 indicating the inclination of the camera-axis $Oh$ with respect to the vertical.

Figure 2:
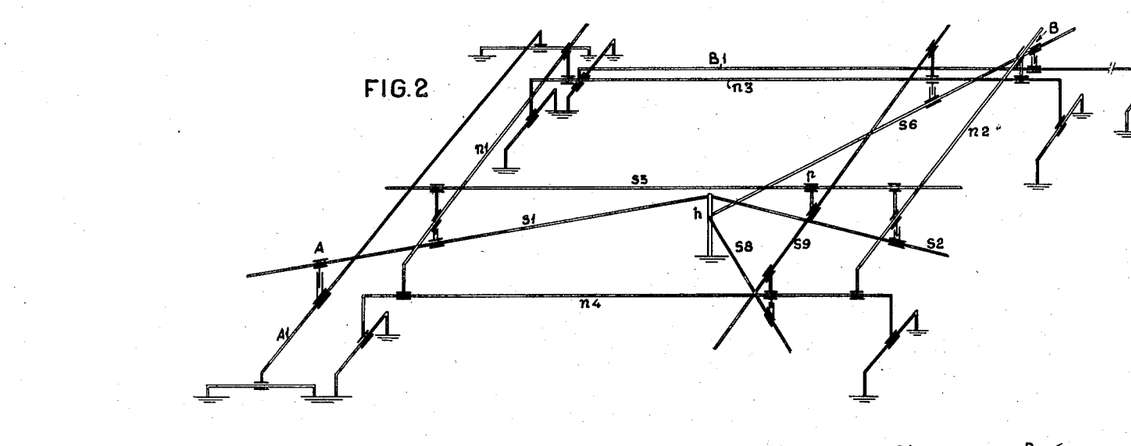
Fig. 2 is a schematic perspective representation of an embodiment of a part of the mechanism of the invention belonging to one photograph of the pair of photographs, suitable for working out photographs taken with a vertical or substantially vertical camera-axis, omitting the coupling with the other similar part of the mechanism and with the measuring mark.

In the Figures 1 and 2, relating to photographs taken with a vertical or substantially vertical camera-axis this inclination is thus to be neglected or zero, so that also the angles $\varphi$ and $\omega$ (or $\varphi'$ and $\alpha'$) are zero.

Figure 3:
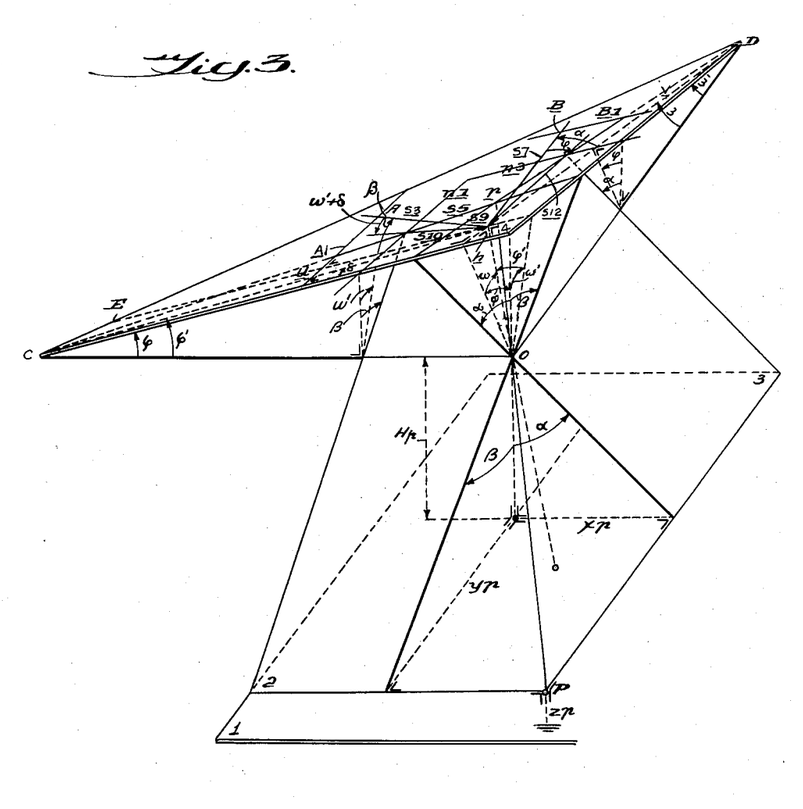
Fig. 3 gives a geometrical construction analogous to Fig. 1, however for an inclined camera-axis.
Figure 4:
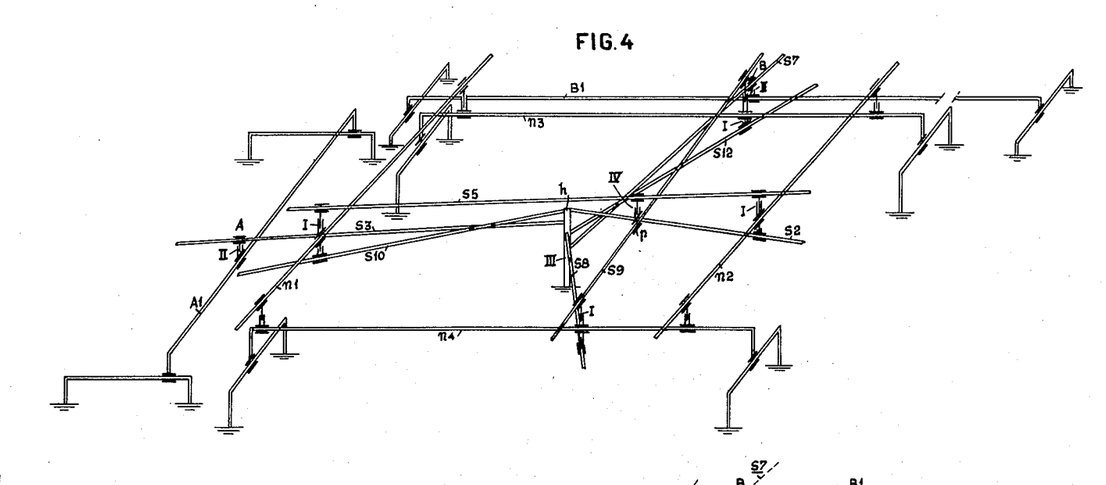
Fig. 4 is analogous to Fig. 2, but represents a part of the mechanism, suitable for accurately working out aerial photographs taken with an arbitrarily inclined camera-axis.
Figure 4A:
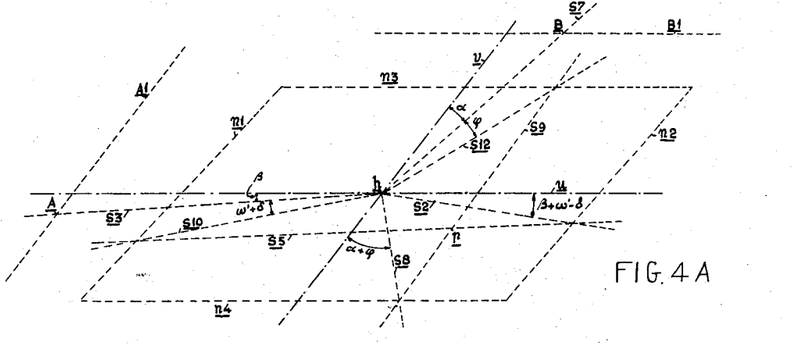
Fig. 4A shows perspectively the geometry of the part of the mechanism shown in Fig. 4 drawn in the plane of the photograph.

The geometrical construction for an inclined camera-axis is indicated in Fig. 3, Fig. 4 representing schematically and perspectively one part of the mechanism of the apparatus of the invention, suitable for accurately working out aerial photographs, taken with an arbitrarily and considerably inclined camera-axis and moreover, dotted. Fig. 4A shows perspectively, the geometricall scheme of said part of the mechanism drawn in the plane of the photograph. The relation between the angles $\omega'$ and $\varphi'$ used in Figures 3 and 4 respectively and the angles $\omega$ and $\varphi$ is given by the equations $$\tan \omega' = \frac{\tan \omega}{\cos \varphi}$$

and $$\sin \varphi' = \sin \varphi \cos \omega$$

In this case the $\varphi$-axis is chosen as the primary axis, by way of example.

Figure 2A:
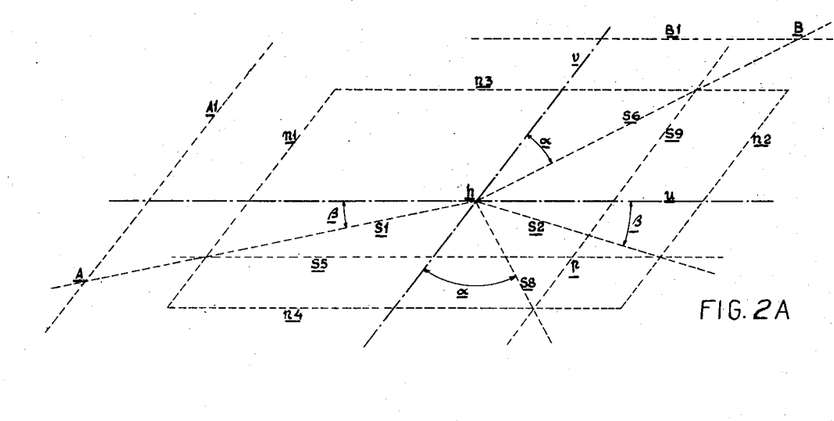
Fig. 2A shows perspectively the geometry of a part of the mechanism drawn in the plane of the photograph.

The object of the invention is to reconstruct the angles $\alpha$ and $\beta$, or the co-ordinates $X_p$, $Y_p$ and $Z_p$ from the position of $p$ if $\omega$ and $\varphi$ are given (in Figs. 1 and 2 they are zero). For this purpose use is made of the fact that between a number of other lines to be determined from the position of S5 and S9 and lying in the plane of the photograph, angles are enclosed, which are simple functions of $\alpha$, $\beta$, $\omega$ and $\varphi$. These lines and angles are indicated in Fig. 1 and partly in Fig. 3 in the plane of the photograph and have been entirely repeated in Figs. 2A and 4A drawn in dotted lines. Use is made of a rectangular system of axes $u$, $v$, the origin in the point $h$ and the $u$-axis lying substantially in the direction of flight as is customary. The straight lines $n1$ and $n2$ corresponding with the conducting rails $n1$ and $n2$ of Fig. 4 are mutually parallel, form an angle $\delta$ with the $v$-axis ($\delta$ is to be determined from $\tan \delta = \sin \omega \tan \varphi$) and are situated at distances of $$f \cdot \frac{\cos \varphi'}{1 + \sin \varphi'}$$

and $$f \cdot \frac{\cos \varphi'}{1 - \sin \varphi'}$$

from $h$, $f$ being equal to $Oh$. As a matter of course in Fig. 2 they lie at a distance $f$ on both sides of $h$.

At the angles $\alpha$ and $\beta$ with respect to the $v$-axis and $u$-axis respectively, lines S6 and S1 may be imagined to be drawn, the points of intersection with the lines B1 and A1 which lines lie at a distance $H_p$ from $h$ (parallel with the $u$-axis and $v$-axis respectively) determining the co-ordinates $X_p$ and $Y_p$.

Figure 5:
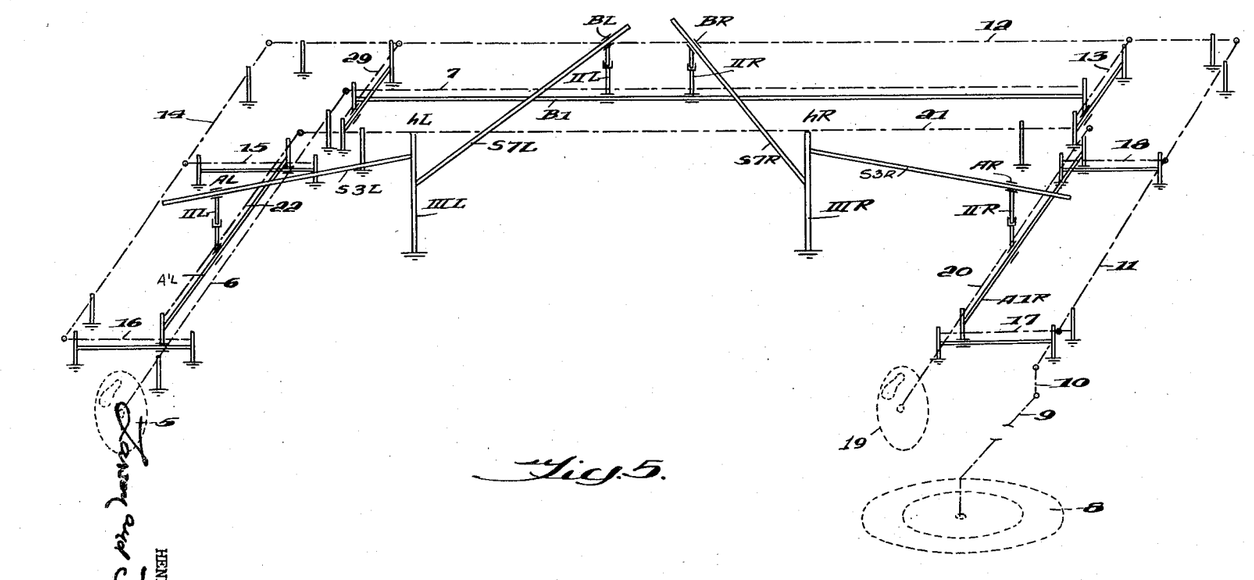
Fig. 5 represents perspectively a possible embodiment of the coupling between the two parts of the mechanism, some parts of the apparatus which are of minor importance being left out.
Figure 6:
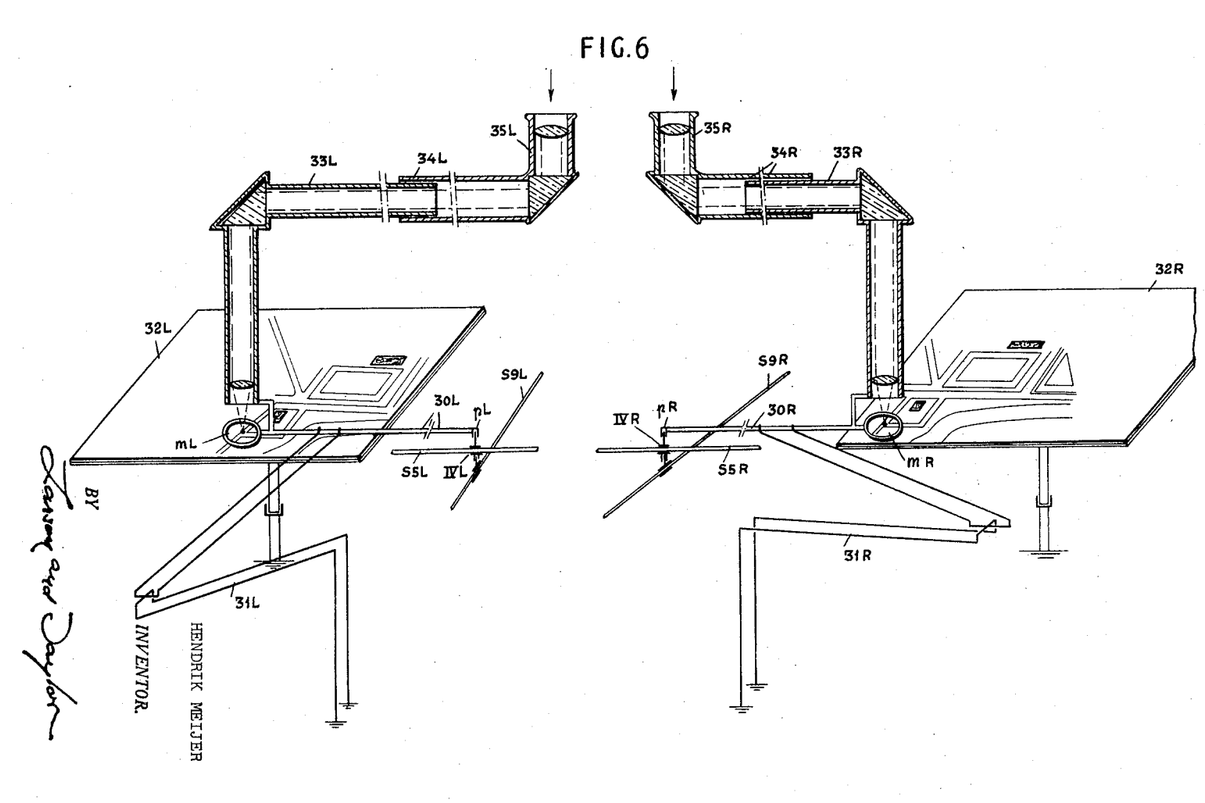
Fig. 6 represents schematically and perspectively a possible embodiment of a coupling of the parts of the mechanism according to Fig. 2 or 4 with their respective measuring marks and with the optical system.

The object of the invention is to materialize the geometrical constructions described above. The embodiment of the apparatus schematically and perspectively shown in Fig. 2 and Fig. 4 is used with one of the two photographs. Naturally, for the working out of a pair of photographs two of these apparatuses should be used, which are coupled in a suitable manner. Figs. 5 and 6 show one possible embodiment of the coupling.

Figure 8:
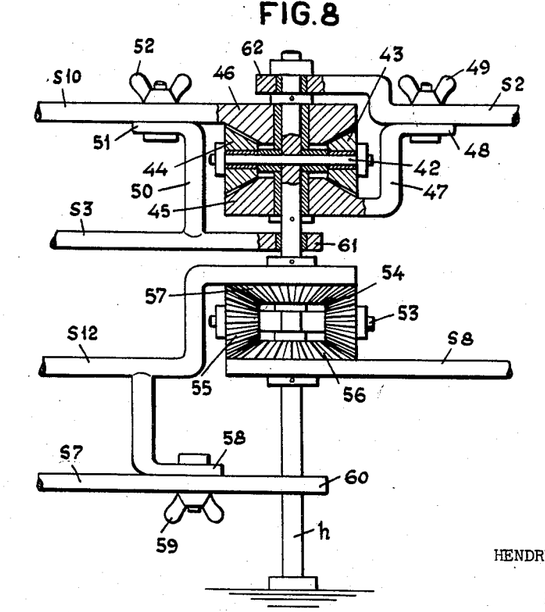
Fig. 8 represents partly a side-view, partly a vertical cross-section of the construction according to Fig. 7.

The apparatus according to Fig. 2 is provided with a fixed axis $h$ around which two pairs of arms S1, S2 and S6, S8 can rotate. The arms which form a pair together are coupled in such a way that with the movement of one arm over a certain angle the other arm moves over the same angle but in opposite direction. A suitable coupling is indicated in Fig. 8. Although this figure represents an axis with arms of an apparatus according to Fig. 4 the coupling itself, which is in fact a planet gear transmission with a fixed planet pinion axis, is as such suitable for the apparatus of Fig. 2.

Figure 9:
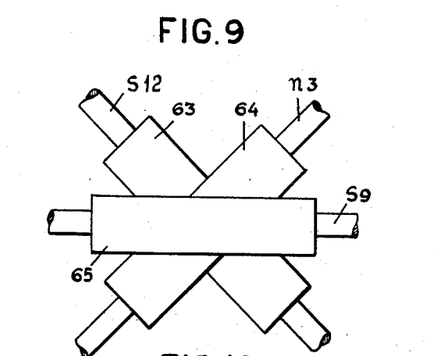
Fig. 9 is a top view of the coupling element, indicated in Fig. 4 with I.
Figure 10:
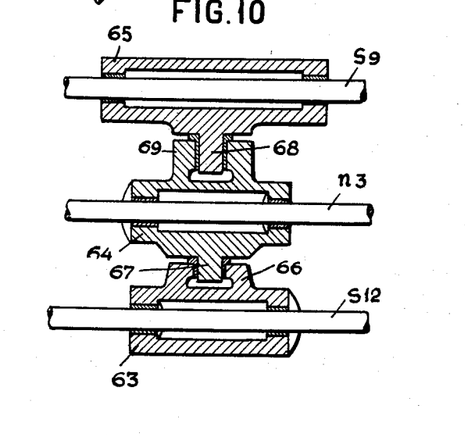
Fig. 10 is a vertical cross-section over the same coupling element.

The pair of arms S1—S2 bears a bar S5, with which it is connected by means of suitable coupling means sliding along the conducting rails n1 and n2 respectively. These coupling means, analogous to an embodiment as shown in Figs. 9 and 10, are constructed in such a way that mutual rotating and axial shifting of a bar and the arm coupled thereto are allowed, but that the "crossing point" of the arm and of the bar moves over a path parallel to said conducting rail.

The pair of arms S6, S8 is connected with the bar S9 in an analogous way by means of coupling means which can be shifted along the conducting rails n3, n4. The point in which the bars S5, S9 cross, corresponds with the point $p$ which is indicated by the measuring mark in this position of the bars S5 and S9 on the photograph and which represents the photographic image of the point P of the terrain. The arms S1, S6 have been constructed in such a way that they cross the co-ordinate rail A1 and B1 respectively. The Y-co-ordinate and the X-co-ordinate respectively of the point of the terrain P can be determined from the position of these "crossing points" A and B on the co-ordinate rails by means of a linear transformation, while the Z-co-ordinate of the point P of the terrain can be determined by means of a linear transformation from the distance between the co-ordinate rail A1 or B1 and the fixed axis $h$.

Fig. 4 shows an embodiment of a part of the mechanism of the apparatus of the invention, corresponding in broad outlines with the apparatus according to Fig. 2, but which is suitable accurately to work out photographs taken with a camera-axis pointed in an arbitrary direction and having an arbitrary and considerable inclination.

In order to eliminate the influence of the inclinations $\varphi$ and $\omega$ the following measures have been taken:

The rails n1 and n2, n3 and n4 can be shifted in the horizontal plane in such a way that the rails n1 and n2, n3 and n4 respectively remain parallel, while the pair n3 and n4 is parallel to the $u$-axis which is substantially parallel to the flight direction and the pair n1 and n2 can be adjusted with the $v$-axis under an angle $\delta$. The arm S1 of Fig. 2 is replaced by the arms S10, S3, which can also rotate around the axis $h$. The arm S10 together with the arm S2 bears the bar S5, the arm S3 crosses the co-ordinate rail A1 in the point A, from the position of which after a linear transformation the y-co-ordinate of the point of the terrain P belonging to $p$ can be found. These arms are provided with means for connecting them mutually under an arbitrarily adjustable angle. In this way it is therefore possible to adjust them in such a way with respect to one another that between their projections in a plane perpendicular to the axis $h$ a correction angle $\omega'+\delta$ is enclosed. The arm S10 is again coupled to the arm S2 in the manner described above so that with the movement of one arm the other moves over the same angle in opposite direction. However, this coupling is effected in such a way here that also to the arm S2 a correction can be given i. e. of $-2\delta$ (also measured in a plane perpendicular to the axis $h$). In a similar way the arm S6 of Fig. 2 is replaced by the arms S12, S7, between which a correction angle $\varphi$ can be adjusted. The arm S12 bears the bar S9 and is furthermore coupled to the arm S8 bearing bar S9, in such a way that the arms can move in opposite directions over the same angles. The arm S7 crosses the co-ordinate rail B1 in a point B, from the position of which after linear transformation the $x$-co-ordinate of the point of the terrain P can be found.

The way in which the bars S3 and S7 can be shifted over the co-ordinate rails A1 and B1 respectively and also the coupling of the left with the right part of the mechanism is schematically represented in Fig. 5. Of course also other embodiments are possible. For the sake of clarity the reference numerals which relate to elements of the left part of the mechanism are provided with an index L, the reference numerals relating to the right part of the mechanism having an index R.

The X movement is brought about by means of a hand wheel 5, which drives the axes 6 and 7 which are mutually connected by conical toothed wheels. The axis 7 is provided with screw thread shifting the coupling means IIR and IIL bearing the bars S7R and S7L respectively, over the rail B1 if the axis is rotated. These coupling means are constructed in parts, so that the bearing box grasping B1 can be turned and shifted with respect to the box in which the bar S7 is introduced.

The Y-movement is brought about by means of the hand wheel 19 which can turn the axes 20, 21 and 22 which are coupled together by means of conical toothed wheels. The axes 20 and 22 are also constructed as threaded bars, so that, if they rotate, the coupling means IIR and IIL are shifted over the co-ordinate rails AIR and AIL respectively, taking the bars S3R and S3L respectively with them. These coupling means have been constructed in such a way that the box grasping in rail A1 can be turned and shifted with respect to the box in which the bar S3 can be shifted. The possibility of shifting the parts of the coupling means II relatively makes it possible to take into account the differences in co-ordinate between the projection centres belonging to the pair of photographs.

The Z-movement is obtained by means of a pedal disk 8 which can turn the axes 9, 10, 11, 12 and 14 mutually coupled by means of conical toothed wheels. Bars 17, 18, 13, 29, 15 and 16, provided with screw thread have also been connected with these axes by means of conial toothed wheels. Turning of the pedal disk 8 therefore causes the co-ordinate rails AIL and AIR and also the co-ordinate rail B1 to shift.

The movements of X, Y and Z can be transmitted in pairs to a coordinatograph in a known manner, with or without an enlarger or reducer, in which co-ordinatograph the position of the adjusted points can be plotted, or each of the movements can be transmitted to counting mechanisms where the shifts can be read off.

An embodiment of the coupling of the two halves of the mechanism with the optical system is shown schematically in Fig. 6. The coupling member IVL (IVR), connecting the bars S5L with S9L (S5R with S9R) and the position of which thus corresponds with the point of the terrain P is connected with the measuring mark $mL$ ($mR$) by means of a bar 30L (30R), which measuring mark, as a result is moved over the left (the right) photograph, fixed on a horizontal table 32L (32R) which can rotate around a vertical axis. The movement of the bar 30L (30R) should always be parallel to itself, for which purpose a parallel guide 31L (31R) serves. A part 33L (33R) of the optical system is connected with the measuring mark $mL$ ($mR$), which part 33L (33R) can shift with respect to the part 34L (34R). Thus with a movement to the left or to the right of the coupling means IV the part 34 of the optical system with the eye-pieces 35L or 35R remains in place. With a movement of the coupling means IV to the front or to the back the part 34 of the optical system with the eye-pieces is also taken to the front or to the back.

As a matter of course other constructions of the optical system are possible (and known), which permit giving the eye-pieces a fixed position. As a kinematic reversal the bar 30 can be connected to the table bearing the photograph, which table is therefore movable in this embodiment, the measuring mark and the observation optics remaining stationary.

Figure 7:
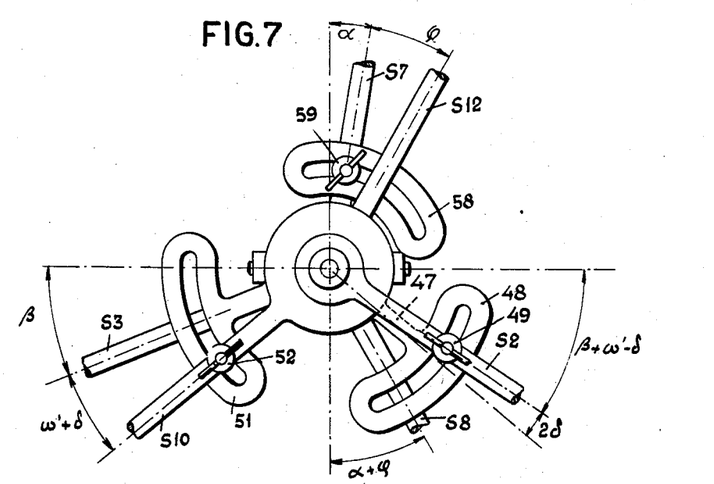

An embodiment of the axis $h$ with the coupling of the arms and bars rotating around this axis, belonging to the embodiment according to Fig. 4, is indicated in Figs. 7 and 8. The fixed axis $h$ is provided with stationary transverse axes 42 and 53, around which the conical toothed wheels 43, 44 and 54, 55 respectively can rotate. The pair of conical toothed wheels 43, 44 is in contact with the conical toothed wheels 46 and 45, the first of which is connected with the arm S10, and the second of which is provided with a bracket 48. The arm S2, which can also rotate around the axis $h$, possesses a clamping screw 49, fitting in a slide of the bracket 48, so that this arm can be firmly connected with the toothed wheel 45, in such a way that the desired angle correction $-2\delta$ is obtained. The co-ordinate bar S3 can also rotate around the axis $h$ and is provided with a bracket 51. S3 and S10 can be connected with each other and a correction angle $\omega'+\delta$ can be adjusted by means of a clamping screw 52 fitting in a slide of said bracket. It is of course clear that with a movement of S3 the arm S10 will follow the movement, the arm S2 being compelled to carry out the same movement, but in opposite direction.

Around the axis $h$ also the co-ordinate bar S7 is pivotably mounted, which bar can be connected with the arm S12 under an angle $\varphi$ by means of a clamping screw 59, fitting in a slide of a bracket 58 connected to the arm S12. The arm S12 is provided with a conical toothed wheel 57, which is in contact with the wheels 54, 55. Also the arm S8 is coupled with these wheels, namely by means of the conical toothed wheel 56. If the co-ordinate bar S7 is moved, the arm S12 follows it, the arm S8 performing the same movement in opposite direction.

Figs. 9 and 10 show schematically in top view and in cross-section respectively an embodiment of a coupling means I. This coupling means is built up mainly from 3 bearing boxes 63, 64 and 65, in which one rail and two bars can slide. In order to make it possible to let the bars and the rail form an arbitrary angle with each other the boxes are pivotably connected with each other, the lower side of the box 64 being provided with a pin 67, said pin fitting in a box 66 mounted on the upper side of the box 63, the upper side of the box 64 being moreover provided with an upright box 69, enclosing a pin 68 extending at the lower side of the box 65. The two pins 68 and 67 are in a direct line with each other.

Figure 11:
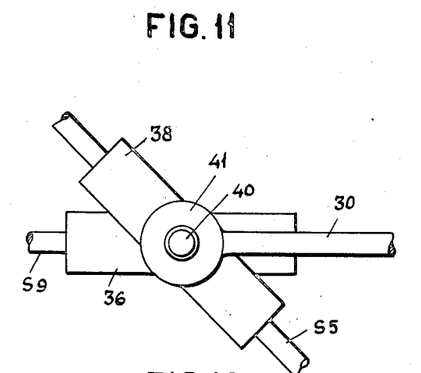
Fig. 11 is a top view of a coupling element IV of Fig. 4.
Figure 12:
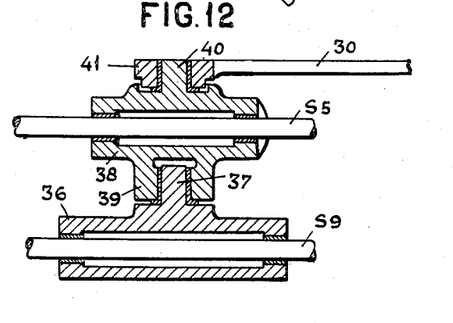
Fig. 12 is a vertical cross-section over the same coupling element.

An embodiment of the coupling means IV is shown in Fig. 11, 12 in top view view and in vertical cross-section respectively. This coupling means consists mainly of two boxes 36, 38 grasping the bar S9 and the bar S5 respectively, so that the bars can shift therein. These two boxes are mutually connected by means of a pin 37 and a box 39 fitting around it, which parts are connected with the boxes 36 and 38 respectively, so that a relative turning of these means with respect to one another is possible. The upper side of the box 38 carries a pin 40 (which is co-axial with the pin 37), around which the bar 30, extending as far as the measuring mark can pivot with an eye 41.

For the embodiment of the apparatus as represented schematically in the Figs. 4, 5 and 6, a description of the working procedure will now follow.

The complete apparatus will consist of two mechanisms according to Fig. 4, which are coupled mechanically in a way as indicated in Fig. 5 and as far as the coupling of the observational system is concerned a sketch is given in Fig. 6.

In the initial phase, a set of overlapping photographs is mounted on the tables 32L and 32R.

The left measuring mark $mL$ (Fig. 6) that corresponds with $pL$ (indicated as $p$ in Fig. 4) will be positioned over a certain image of a terrain point. This can be observed by means of the optical observation-system (33L—34L—35L). To bring $mL$ in correspondence with another image of the photograph, $pL$ has to be moved by which movement simultaneously the measuring mark $mL$ and the observational system make corresponding movements.

For reasons of constructional convenience this movement is effected by rotating the handwheels 5 and 19 (Fig. 5). The rotation of 5 (or 19) moves a coupling means (IIL) along the co-ordinate rails B1 (or A1L). This coupling means (IIL) drives the arm S7L (or S3L) so that this arm swings around the vertical axis $hL$. The arm S12 (or $s10$, see Fig. 4) will make a corresponding movement since it is coupled to S7L (or S3L) by means of the coupling elements 58 and 59 (or 51 and 52) as indicated in Figs. 7 and 8.

At the same time the arm $s8$ (or $s2$) will perform an equal swinging movement around $hL$ but in opposite direction as a consequence of the planet-gear transmission 53 till 57 (or 42 till 46) as indicated in Figs. 7 and 8.

The swinging movements of the arms $s12$ and $s8$ (or $s10$ and $s2$) carry coupling elements of type I along the rails $n3$ and $n4$ (or $n1$ and $n2$). These coupling elements in their turn support the bar $s9$ (or $s5$) so that this bar is moved according to the movements of the coupling elements. The axis of the coupling element type IV, which connects the bars $s9$ and $s5$ and which is illustrated in more detail in Figs. 11 and 12, follows the movements of those bars and since it defines the point $p$ (Fig. 4) this point is moved according to the rotation of the handwheels 5 and 19 (Fig. 5).

Since a coupling element of type II (in Fig. 5 indicated with IIR), belonging to that part of the mechanism which is meant for the right photograph, is conducted along the rail B1 (or A1R) by a same rotation of the handwheel 5 (or 19), the arms $s7R$ (or $s3R$) corresponding with $s7L$ (or $s3L$) will also perform a swinging movement around the pivot $hR$ and furthermore the right measuring mark $mR$ will be moved over the right photograph in a completely analogous way as described for the left part of the apparatus.

The right measuring mark will now be a certain distance from the image on the right photograph which corresponds with the image on the left photograph on which the left measuring mark had been set. This distance is called a parallax. By observing parallaxes in at least 5 points in the overlapping part of the two photographs, it is possible to compute, by means of a set of well-known formulas, the differences in inclination of two photographs ($\omega$ and $\varphi$) as well as their relative amounts of displacement.

The computed values of $\omega$ and $\varphi$, and the values of $\omega'$, $\varphi$ and $\delta$ derived therefrom are, as far as necessary, applied to correct the adjustment of the instrument. In effect I set on one of the mechanisms an angle $\varphi$ between the arms $s7$ and $s12$ (Fig. 7), an angle $(\omega'+\delta)$ between the arms $s3$ and $s10$ and an angle $2\delta$ between the arm $s2$ and the coupling element 48.

At the same time the rails $n1$ and $n2$ must be adjusted to the now computed distances to $h$ and rotated in the horizontal plane over an angle $\delta$, whereas the rails $n3$ and $n4$ are brought as well to the now computed distances from $h$. Besides the coupling means IIR (Fig. 5) are shifted over the rail belonging thereto relatively with respect to the coupling means IIL, the amount of shifting being likewise computed from the parallax observations.

After applying the said corrections the parallaxes in all points that are subsequently observed will now be removed with the exception of those caused by remaining errors in the setting of H$p$. These parallaxes are now eliminated by varying the distance of the rail B1 to the pivots $hL$ and $hR$ and the rail A1R to $hR$ and the rail A1L to $hL$ over the same amount and in the same direction. This can be effected by a rotation of the pedal-disk 8 (Fig. 5) which, by means of the threaded bars 13—29, 15—16 and 17—18, displace the said rails parallel to themselves. The thus effected displacement is a measure for the elevation of the terrainpoint with respect to the projection center. The correct coordinates X and Y are now determined by the position of the coupling elements II on the coordinate rails A1L, A1R and B1.

If the terrain coordinates of at least 3 points, represented on both photographs, are known, a new set of corrections can be determined by comparing these coordinates to the coordinates measured in the instrument after the previous settings. These new corrections ($\varphi$, $\omega$, and functions thereof) are now introduced in both mechanisms in the way as described above, the effect of which will be that now for all points in the overlap of both photographs coordinates in the terrain system can be read. It is sometimes common practice to apply this second set of corrections by computation.

When the apparatus according to the invention is used for the restitution of single photographs, only the mechanism as shown in Fig. 4 is sufficient if this is coupled with a measuring mark and an observational system corresponding with one half of that drawn in Fig. 5. The quantities to be adjusted in the instrument (($\varphi$, $\omega$, $\delta$, $\varphi'$, $\omega'+hp$) can now be found by comparing the coordinates of at least four points on the terrain with the corresponding values measured by setting the measuring mark subsequently on the four images of those terrain points on the photograph.

The working of the different parts of the instrument is exactly the same as described above and need therefore not be repeated here.

The apparatus according to the invention, as described above, offers a complete and exact solution of the problem of reconstructing the position of terrain points from a single or from a pair of photographs.

In common practice it is not always necessary, nor always economically justified to aim at this maximal perfection. In these cases the exact solution of the problem can, with advantage, be replaced by an approximate solution.

It is a special and favorable property of the apparatus according to the invention that, with preservation of its principle of defining the image point $p$ as the crosspoint of two bars, it offers several possibilities of simplification.

The applicability of these simplifications for the solution of a certain napping problem depends on the accuracy which is required for the special case and cannot be foreseen.

A first simplification can be obtained by constructing the rails $n1$, $n2$, $n3$ and $n4$ (see Fig. 4) in such a way that they can only be shifted with respect to the pivot $h$ but without the possibility of changing their direction on the horizontal plane.

A second simplification is obtained by combining the first one with the replacement of the arms $s3$ and $s10$ by one arm which is simultaneously supported by a coupling means type I on rail $n1$ and by a coupling means type II on rail A1, thus eliminating the possibility of the adjustment of the angle $\omega'+\delta$ between said arms $s3$ and $s10$.

A third simplification is obtained by combining the first one with the replacement of the arms $s7$ and $s12$ by one arm which is supported simultaneously by a coupling means type I on rail $n3$ and by a coupling means type II on rail B1, thus eliminating the possibility of adjusting the angle $\varphi$ between said bars $s7$ and $s12$.

A fourth simplification is obtained by combining the first one with the second and the third, thus eliminating the possibility of adjusting the angles ($\omega'+\delta$) as well as $\varphi$ between the corresponding arms.

As an illustration of the embodiment of the mechanism according to this fourth simplification reference is made to Figs. 1 and 2.

It is obvious that the said simplifications can be applied either for the case where only one mechanism is used for the restitution of single photographs, or for the case where two coupled mechanisms are used for the restitution of a pair of overlapping photographs.

I claim:

1. A photogrammetric apparatus for determining the position of points on a terrain from air photographs comprising a pair of mechanisms coupled together, each of said mechanisms having a measuring mark, each measuring mark and the image of a terrainpoint on the corresponding photograph being movable with respect to each other for obtaining visual coincidence, each mechanism further including a pair of bars coupled together, said bars being disposed in planes parallel to the plane of the photographs, one of said bars representing the line of intersection of the plane of the photograph and a first plane through the terrainpoint and through the center of the lens of the camera with which the photograph has been made, said first plane being disposed substantially parallel to the line of flight of the photographing aircraft and the other of said bars representing the line of intersection of the plane of the photograph and a plane through said terrain point, the center of the lens of the camera with which the photograph has been made, said last-named plane being substantially transverse to the line of flight of the photographing aircraft, the point of intersection of said bars representing the image of the terrainpoint over which said measuring mark is positioned and means coupled to said bars for measuring the spacial coordinates of the point in a terrain coordinate system.

2. A photogrammetric apparatus for determining the position of points of a terrain from air photographs comprising a pair of mechanisms coupled together, each of said mechanisms having a measuring mark, each measuring mark and the image of a terrainpoint on the corresponding photograph being movable with respect to each other for obtaining visual coincidence, each mechanism further including a pair of bars parallel to the plane of the photographs, one of said bars representing the line of intersection of the plane of the photograph and a first plane through the terrainpoint and through the center of the lens of the camera with which the photograph has been made and disposed substantially parallel to the line of flight of the photographing aircraft and the other of said bars representing the line of intersection of the plane of the photograph and a plane through the said terrainpoint and through the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the spacial coordinates of the point in a terrain coordinate system, which means include a vertical axis around which, for each of said bars, three arms can rotate, a pair of said arms being coupled in such a way that if one arm of said pair rotates over a certain angle the other arm of said pair rotates over the same angle in opposite direction, the third arm being adjustably connected with one of the arms of said pair, each of the said bars being provided with a pair of mutually parallel horizontal conducting rails, which rails lie at an adjustable distance and in an adjustable direction on both sides of the said vertical axis, and with a horizontal coordinate rail situated at an adjustable distance from the said vertical axis which distance corresponds with the vertical distance between the lens and the terrainpoint, the said pair of coupled arms bearing the bar by means of coupling means sliding over the conducting rails belonging thereto in such a way that the crossing point of the bar and one arm remains vertically over the rail belonging thereto, the third arm being coupled to the said coordinate-rail by means of a coupling means sliding over this rail, the position of this coupling means on the coordinate-rail being a measure for one of the planimetric coordinates in a terrain system of the point on which the measuring mark has been set.

3. A photogrammetric apparatus for determining the position of points on a terrain from air photographs comprising a pair of mechanisms coupled together, each of said mechanisms having a measuring mark, each measuring mark and the image of a terrain-point on the corresponding photograph being movable with respect to each other for obtaining visual coincidence, each mechanism further including a pair of bars coupled together, said bars being disposed in planes parallel to the plane of the photographs, one of said bars representing the line of intersection of the plane of the photograph and a first plane through the terrainpoint and through the center of the lens of the camera with which the photograph has been made and disposed substantially parallel to the line of flight of the photographing aircraft and the other of said bars representing the line of intersection of the plane of the photograph and a plane through said terrainpoint and through the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the spacial coordinates of the point in a terrain coordinate system, which means include a vertical axis around which for each of said bars, three arms can rotate, a pair of said arms being coupled in such a way that if one arm of said pair rotates over a certain angle the other arm of said pair rotates over the same angle in opposite direction, the third arm being adjustably connected with one of the arms of said pair, each of the said bars being provided with a pair of mutually parallel horizontal conducting rails, which rails lie at an adjustable distance on both sides of the said vertical axis, and with a horizontal coordinate rail situated at an adjustable distance from the said vertical axis which distance corresponds with the vertical distance between the lens and the terrainpoint, the said pair of coupled arms bearing the bar by means of coupling means sliding over the conducting rails belonging thereto in such a way that the crossing point of the bar and one arm remains vertically over the rail belonging thereto, the third arm being coupled to the said coordinate-rail by means of a coupling means sliding over this rail, the position of this coupling means on the coordinate-rail being a measure for one of the planimetric coordinates in a terrain system of the point on which the measuring mark has been set.

4. A photogrammetric apparatus for determining the position of points on a terrain from air photographs comprising a pair of mechanisms coupled together, each of said mechanisms having a measuring mark, each measuring mark and the image of a terrainpoint on the corresponding photograph being movable with respect to each other for obtaining visual coincidence, each mechanism further including a pair of bars coupled together, said bars being disposed in planes parallel to the plane of the photographs, one of said bars representing the line of intersection of the plane of the photograph and a first plane through the terrainpoint and through the center of the lens of the camera with which the photograph has been made, and disposed substantially parallel to the line of flight of the photographing aircraft and the other of said bars representing the line of intersection of the plane of the photograph and a plane through the said terrain point, the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the spacial coordinates of the point in a terrain coordinate system, which means include a vertical axis around which, for each of said bars, two arms can rotate, being coupled with each other in such a way that, if one arm rotates over a certain angle the other arm rotates over the same angle in opposite direction, each of the said bars being provided with a pair of mutually parallel horizontal conducting rails, which rails lie at an adjustable distance on both sides of the said vertical axis, and with a horizontal coordinate rail situated at an adjustable distance from the said vertical axis which distance corresponds with the vertical distance between the lens and the terrainpoint, the pair of said coupled arms bearing the bar by means of coupling means sliding over the conducting rails belonging thereto in such a way that the crossing point of one arm and the bar remains vertically over the rail belonging thereto, one of the said arms being also coupled to the said coordinate rail by means of a coupling means sliding over this rail, the position of this coupling means on the coordinate rail being a measure for one of the planimetric coordinates in a terrain system of the point on which the measuring mark has been set.

5. A photogrammetric apparatus for determining the position of points on a terrain from air photographs comprising a pair of mechanisms coupled together, each of said mechanisms having a measuring mark, each measuring mark and the image of a terrainpoint on the corresponding photograph being movable with respect to each other for obtaining visual coincidence, each mechanism further including a pair of bars coupled together, said bars being disposed in planes parallel to the plane of the photographs, one of the said bars representing the line of intersection of the plane of the photograph and a first plane through the terrainpoint and through the center of the lens of the camera with whcih the photograph has been made, and disposed substantially parallel to the line of flight of the photographing aircraft and the other of said bars representing the line of intersection of the plane of the photograph and a plane through the said terrainpoint and through the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the spacial coordinates of the point in a terrain coordinate system, which means include a vertical axis around which for one of said bars, three arms can rotate, a pair of said arms being coupled in such a way that if one arm of said pair rotates over a certain angle the other arm of said pair rotates over the same angle in opposite direction, the third arm being adjustably connected with one of the arms of said pair, one bar provided with a pair of mutually parallel horizontal conducting rails, which rails lie at an adjustable distance on both sides of the said vertical axis, and with a horizontal coordinate rail situated at an adjustable distance from the said vertical axis which distance cooresponds with the vertical distance between the lens and the terrainpoint, the said pair of coupled arms bearing the bar by means of coupling means sliding over the conducting rails belonging thereto in such a way that the crossing point of the bar and one arm remains vertically over the rail belonging thereto, the third arm being coupled to the said coordinate-rail by means of a coupling means sliding over this rail, the position of this coupling means on the coordinate-rail being a measure for one of the planimetric coordinates in a terrain system of the point on which the measuring mark has been set for, the other of said bars having two rotatable arms coupled with each other in such a way that, if one arm rotates over a certain angle the other arm rotates over the same angle in opposite direction, said other bar having a pair of mutually parallel horizontal conducting rails, which rails lie at an adjustable distance on both sides of the said vertical axis, and with a horizontal coordinate rail situated at an adjustable distance from the said vertical axis which distance corresponds with the vertical distance between the lens and the terrainpoint, the pair of said coupled arms bearing the bar by means of coupling means sliding over the conducting rails belonging thereto in such a way that the crossing point of one arm and the bar remains vertically over the rail belonging thereto, one of the said arms being also coupled to the said coordinate rail by means of a coupling means sliding over this rail, the position of this coupling means on the coordinate rail being a measure for the second of the planimetric coordinates in a terrain system of the point on which the measuring mark has been set.

6. A photogrammetric apparatus for determining the position of points on a terrain from a single airphotograph comprising a mechanism having a measuring mark, this measuring mark and the image of a terrainpoint on the photograph being movable with respect to each other for obtaining visual coincidence the mechanism further including a pair of bars coupled together, said bars being disposed in planes parallel to the plane of the photograph, one of said bars representing the line of intersection of the plane of the photograph and a first plane through the terrainpoint and through the center of the lens of the camera with which the photograph has been made and disposed substantially parallel to the line of flight of the photographing aircraft and the other of said bars representing the line of intersection of the plane of the photograph and a plane through said terrainpoint and through the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the planimetric coordinates of the point in a terrain coordinate system.

7. A photogrammetric apparatus for determining the position of points on a terrain from a single airphotograph comprising a mechanism having a measuring mark, this measuring mark and the image of a terrainpoint on the photographs being movable with respect to each other for obtaining visual coincidence the mechanism further including a pair of bars coupled together, said bars being disposed in planes parallel to the plane of the photograph, one of said bars representing the line of intersection of the plane of the photograph and a first plane through the terrainpoint and through the center of the lens of the camera with which the photograph has been made and disposed substantially parallel to the line of flight of the photographing aircraft and the other of said bars representing the line of intersection of the plane of the photograph and a plane through said terrainpoint and through the center of the lens of the camera with which the photograph has been made and disposed substantially transverse to the line of flight of the photographing aircraft, the point of intersection of said bars reprsenting the image of the terrainpoint over which said measuring mark is positioned and means coupled to said bars for measuring the planimetric coordinates of the point in a terrain coordinate system, which means include a vertical axis around which, for each of said bars, three arms can rotate, a pair of said bars being coupled in such a way that if one arm of said pair rotates over a certain angle the other arm of said pair rotates over the same angle in opposite direction, the third arm being adjustable connected with one of the arms of said pair, each of said bars being provided with a pair of mutually parallel horizontal conducting rails, which rails lie at an adjustable distance and in an adjustable direction on both sides of the said vertical axis, and with a horizontal coordinate rail situated at an adjustable distance from the said vertical axis which distance corresponds with the vertical distance between the lens and the terrainpoint, the said pair of coupled arms bearing the bar by means of coupling means sliding over the conducting rails belonging thereto in such a way that the crossing point of the bar and one arm remains vertically over the rail belonging thereto, the third arm being coupled to the said coordinate-rail by means of a coupling means sliding over this rail, the position of this coupling means on the coordinate-rail being a measure for one of the planimetric coordinates in a terrain system of the point on which the measuring mark has been set.

8. A photogrammetric apparatus for determining the position of points on a terrain from a single airphotograph comprising a mechanism having a measuring mark, this measuring mark and the image of a terrainpoint on the photograph being movable with respect to each other for obtaining visual coincidence the mechanism further including a pair of bars coupled together, said bars being disposed in planes parallel to the plane of the photograph, one of said bars representing the line of intersection of the plane of the photograph and a first plane through the terrainpoint and through the center of the lens of the camera with which the photograph has been made and disposed substantially parallel to the line of flight of the photographing aircraft and the other of said bars representing the line of intersection of the plane of the photograph and a plane through said terrainpoint and through the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the planimetric coordinates of the point in a terrain coordinate system, which means include a vertical axis around which, for each of said bars, three arms can rotate, a pair of said arms being coupled in such a way that if one arm of said pair rotates over a certain angle the other arm of said pair rotates over the same angle in opposite direction, the third arm being adjustably connected with one of the arms of said pair, each of the said bars being provided with a pair of mutually parallel horizontal conducting rails, which rails lie at an adjustable distance on both sides of the said vertical axis, and with a horizontal coordinate rail situated at an adjustable distance from the said vertical axis which distance corresponds with the vertical distance between the lens and the terrainpoint, the said pair of coupled arms bearing the bar by means of coupling means sliding over the conducting rails belonging thereto in such a way that the crossing point of the bar and one arm remains vertically over the rail belonging thereto, the third arm being coupled to the said coordinate-rail by means of a coupling means sliding over this rail, the position of this coupling means on the coordinate-rail being a measure for one of the planimetric coordinates in a terrain system of the point on which the measuring mark has been set.

9. A photogrammetric apparatus for determining the position of points on a terrain from a single airphotograph comprising a mechanism having a measuring mark, this measuring mark and the image of a terrainpoint on the photograph being movable with respect to each other for obtaining visual coincidence the mechanism further including a pair of bars coupled together, said bars being disposed in planes parallel to the plane of the photograph, one of said bars representing the line of intersection of the plane of the photograph and a first plane through the terrainpoint and through the center of the lens of the camera with which the photograph has been made and disposed substantially parallel to the line of flight of the photographing aircraft and the other of said bars representing the line of intersection of the plane of the photograph and a plane through said terrainpoint and through the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the planimetric coordinates of the point in a terrain coordinate system, which means include a vertical axis around which, for each of said bars, two arms can rotate, said arms being coupled with each other in such a way that, if one arm rotates over a certain angle the other arm rotates over the same angle in opposite direction, each of the said bars being provided with a pair of mutually parallel horizontal conducting rails, which rails lie at an adjustable distance on both sides of the said vertical axis, and with a horizontal coordinate rail situated at an adjustable distance from the said vertical axis which distance corresponds with the vertical distance between the lens and the terrainpoint, the pair of said coupled arms bearing the bar by means of coupling means sliding over the conducting rails belonging thereto in such a way that the crossing point of one arm and the bar remains vertically over the rail belonging thereto, one of the said arms being also coupled to the said coordinate rail by means of a coupling means sliding over this rail, the position of this coupling means on the coordinate rail being a measure for one of the planimetric coordinates in a terrain system of the point on which the measuring mark has been set.

10. A photogrammetric apparatus for determining the position of points on a terrain from a single airphotograph comprising a mechanism having a measuring mark, this measuring mark and the image of a terrainpoint on the photograph being movable with respect to each other for obtaining visual coincidence the mechanism further including a pair of bars coupled together, said bars being disposed in planes parallel to the plane of the photograph, one of said bars representing the line of intersection of the plane of the photograph and a first plane through the terrainpoint and through the center of the lens of the camera with which the photograph has been made and disposed substantially parallel to the line of flight of the photographing aircraft and the other of said bars representing the line of intersection of the plane of the photograph and a plane through said terrainpoint and through the center of the lens of the camera with which the photograph has been made and disposed substantially transverse to the line of flight of the photographing aircraft, the point of intersection of said bars representing the image of the terrainpoint over which said measuring mark is positioned and means coupled to said bars for measuring the planimetric coordinates of the point in a terrain coordinate system, which means include a vertical axis around which, for one of said bars, three arms can rotate, a pair of said arms being coupled in such a way that if one arm of said pair rotates over a certain angle the other arm of said pair rotates over the same angle in opposite dirertion, the third arm being adjustably connected with one of the arms of said pair, and this bar being provided with a pair of mutually parallel horizontal conducting rails, which rails lie at an adjustable distance on both sides of the said vertical axis, and with a horizontal coordinate rail situated at an adjustable distance from the said vertical axis which distance corresponds with the vertical distance between the lens and the terrainpoint, the said pair of coupled arms bearing the bar by means of coupling means sliding over the conducting rails belonging thereto in such a way that the crossing point of the bar and one arm remains vertically over the rail belonging thereto, the third arm being coupled to the said coordinate-rail by means of a coupling means sliding over this rail, the position of this coupling means on the coordinate-rail being a measure for one of the planimetric coordinates in a terrain system of the point on which the measuring mark has been set for, the other of said bars having two rotatable arms coupled with each other in such a way that, if one arm rotates over a certain angle the other arm rotates over the same angle in opposite direction, said other bar being provided with a pair of mutually parallel horizontal conducting rails, which rails lie at an adjustably connected distance on both sides of the said vertical axis, and with a horizontal coordinate rail situated at an adjustable distance from the said vertical axis which distance corresponds with the vertical distance between the lens and the terrainpoint, the pair of said coupled arms bearing the bar by means of coupling means sliding over the conducting rails belonging thereto in such a way that the crossing point of one arm and the bar remains vertically over the rail belonging thereto, one of the said arms being also coupled to the said coordinate rail by means of a coupling means sliding over this rail, the position of this coupling means on the coordinate rail being a measure for the second of the planimetric coordinates in a terrain system of the point on which the measuring mark has been set.

References Cited in the file of this patent

UNITED STATES PATENTS

| | | |
|---|---|---|
| 1,467,163 | Hugershoff | Sept. 4, 1923 |
| 1,565,413 | Brock et al. | Dec. 15, 1925 |
| 1,713,498 | Cooke | May 14, 1929 |
| 1,894,953 | Holst | Jan. 24, 1933 |
| 1,910,425 | Cahill | May 23, 1933 |
| 1,937,711 | Nelles et al. | Dec. 5, 1933 |
| 1,980,981 | Cooke | Nov. 20, 1934 |
| 2,044,114 | Bagley | June 16, 1936 |
| 2,085,498 | Horner | June 29, 1937 |
| 2,102,612 | Collier | Dec. 21, 1937 |

FOREIGN PATENTS

| | | |
|---|---|---|
| 157,236 | Great Britain | July 10, 1922 |